(12) United States Patent
Huffman et al.

(10) Patent No.: US 11,720,812 B2
(45) Date of Patent: Aug. 8, 2023

(54) VISUAL REPRESENTATION OF QUBIT STOCHASTIC ERRORS AND THE IMPACT ON PERFORMANCE OF A QUANTUM CIRCUIT

(71) Applicant: International Business Machines Corporation, Armonk, NY (US)

(72) Inventors: Joel Russell Huffman, Austin, TX (US); Julianna E. Murphy, Austin, TX (US); Douglas Templeton McClure, III, Chappaqua, NY (US); Christopher James Wood, Tarrytown, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 635 days.

(21) Appl. No.: 16/740,663

(22) Filed: Jan. 13, 2020

(65) Prior Publication Data
US 2021/0216898 A1    Jul. 15, 2021

(51) Int. Cl.
*G06N 10/00* (2022.01)
*G06F 11/32* (2006.01)
*G06F 11/07* (2006.01)
*G06F 30/20* (2020.01)

(52) U.S. Cl.
CPC ......... *G06N 10/00* (2019.01); *G06F 11/0706* (2013.01); *G06F 11/32* (2013.01); *G06F 30/20* (2020.01)

(58) Field of Classification Search
CPC ........ G06N 10/00; G06N 10/20; G06N 10/80; G06F 11/0706; G06F 11/32; G06F 30/20; G06F 30/327; G06F 30/33; G06F 2111/08; G06F 2119/10; G06F 30/31

USPC .......................................................... 706/62
See application file for complete search history.

(56) References Cited

U.S. PATENT DOCUMENTS

| | | | |
|---|---|---|---|
| 6,212,650 B1 | 4/2001 | Guccione | |
| 9,152,746 B2 | 10/2015 | Troyer et al. | |
| 10,140,404 B2 | 11/2018 | Rigetti et al. | |
| 2003/0169041 A1 | 9/2003 | Coury et al. | |
| 2017/0228483 A1* | 8/2017 | Rigetti | G06F 30/367 |
| 2017/0351974 A1 | 12/2017 | Rose et al. | |
| 2019/0007051 A1 | 1/2019 | Sete et al. | |
| 2019/0102496 A1 | 4/2019 | Bishop et al. | |
| 2020/0395448 A1* | 12/2020 | Conradson | H01L 21/02565 |

(Continued)

FOREIGN PATENT DOCUMENTS

WO    2019002934    1/2019

OTHER PUBLICATIONS

Svore et al., "A flow-map model for analyzing pseudo-thresholds in fault-tolerant quantum computing," Quant. Inf. Comp. vol. 6, No. 3, Jan. 12, 2006, 20 pages.

*Primary Examiner* — James C Kerveros
(74) *Attorney, Agent, or Firm* — Amin, Turocy & Watson, LLP

(57) ABSTRACT

Systems and methods that address an optimized method to have a visual representation of qubit stochastic errors. A visual representation is generated of qubit stochastic errors that provides a platform to analyze impact on performance of a quantum circuit to facilitate understanding how noise and error impacts circuit results. Stochastic errors accumulated throughout a circuit are visualized using a gradient overlay.

29 Claims, 11 Drawing Sheets

(56) References Cited

U.S. PATENT DOCUMENTS

2021/0036206 A1* 2/2021 Neill ...................... G06N 10/00
2021/0150001 A1* 5/2021 Pikus ...................... G06F 30/20

* cited by examiner

```
Data for ibmqx4 IBM Q 5 Tenerife coupling_map = [[1,0],[2,0],[2,1],[3,2],[3,4],[4,2]]

q[0] values          q[1] values          q[2] values          q[3] values
-----------          -----------          -----------          -----------
T1 = 47µs            T1 = 35µs            T1 = 46µs            T1 = 48µs gate   time (µs)     gate   time (µs)     gate   time (µs)     gate   time (µs)
----   ---------     ----   ---------     ----   ---------     ----   ---------
u1     0.0           u1     0.0           u1     0.0           u1     0.0
u2     0.06          u2     0.06          u2     0.06          u2     0.06
u3     0.12          u3     0.12          u3     0.12          u3     0.12
CX1_0  0.34          CX1_0  0.34          CX2_1  0.52          CX3_2  0.62
                     CX2_1  0.52          CX3_2  0.62
```

FIG. 6B

VISUAL REPRESENTATION OF QUBIT STOCHASTIC ERRORS AND THE IMPACT ON PERFORMANCE OF A QUANTUM CIRCUIT

TECHNICAL FIELD

The subject disclosure relates generally to system(s) and method(s) that formulate efficient visual representation of qubit stochastic error(s) and analyze impact on performance of a quantum circuit.

SUMMARY

The following presents a summary to provide a basic understanding of one or more embodiments of the invention. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that facilitate visual representation of qubit stochastic errors in quantum computing and analyze the impact on performance of a quantum circuit.

In accordance with an embodiment, a system, comprises: a memory that stores computer executable components; and a classical processor that executes the following computer executable components: a simulation component that creates a quantum circuit; a compiling component that compiles the quantum circuit by unrolling complex gates to a quantum processor's basis gates and mapping the complex gates to a topology of the quantum processor wherein the basis gates and the topology are properties of the quantum processor; a determination component that sets a desired threshold for a percentage of a qubit relaxation across the quantum circuit; and a visualization component that generates a visualization of the qubit relaxation by altering the visual appearance of a qubit based on the desired threshold for the qubit relaxation.

In accordance with another embodiment, a computer-implemented method comprises: simulating, using a classical processor, a quantum circuit; compiling, using the classical processor, a quantum circuit by unrolling complex gates to a quantum processor's basis gates and mapping the complex gates to a topology of the quantum processor wherein the basis gates and the topology are properties of the quantum processor; setting, using the classical processor, a desired threshold for a percentage of a qubit relaxation across the quantum circuit; and generating, using the classical processor, a visualization of the qubit relaxation by altering the visual appearance of a qubit based on the desired threshold for the qubit relaxation.

In accordance with yet another embodiment, a system comprises a memory that stores computer executable components; and a quantum processor that executes the following computer executable components: a receiving component that receives a compiled quantum circuit from a classical computer; a computing component that employs a qubit value and multiplies it times percent qubit relaxation to generate a new threshold for a qubit; and a transmitting component that transmits a computed quantum circuit to the classical computer.

In accordance with an embodiment, a computer-implemented method comprises: using the quantum processor to execute computer executable components stored in memory to perform the following acts: using the quantum processor to receive a compiled quantum circuit from a classical computer; using the quantum processor to compute a new threshold for a qubit by taking a qubit relaxation value and multiply it times percent qubit relaxation; and using the quantum processor to transmit a computed quantum circuit to the classical computer.

In accordance with other embodiments, computer program products can implement embodiments described herein.

DESCRIPTION OF THE DRAWINGS

FIG. 6B illustrates a set of data associated with FIG. 6A.

DETAILED DESCRIPTION

Figure 1:
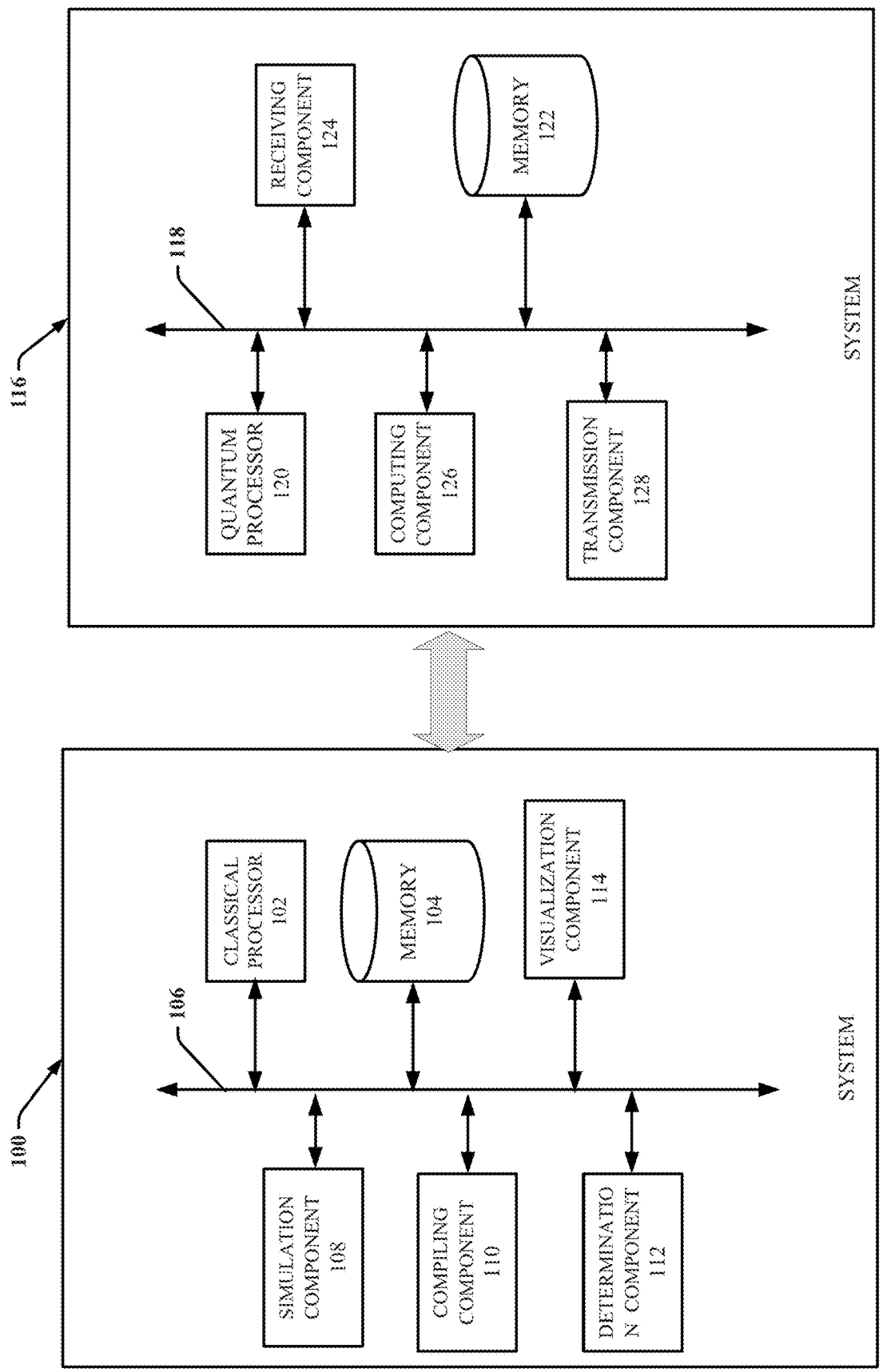
FIG. 1 illustrates a block diagram of an example system implemented that provides a visual representation of qubit stochastic errors in quantum computing and the impact on the performance of a quantum circuit.

The following detailed description is merely illustrative and is not intended to limit embodiments and/or application or uses of embodiments. Furthermore, there is no intention to be bound by any expressed or implied information presented in the preceding Summary section, or in the Detailed Description section. One or more embodiments are now described with reference to the drawings, wherein like reference numerals are used to refer to like elements throughout. In the following description, for purposes of explanation, numerous specific details are set forth in order to provide a more thorough understanding of the one or more embodiments. It is evident; however, in various cases, that the one or more embodiments can be practiced without these specific details.

In today's digital world, data plays a prime factor in many applications. Action(s) taken can often leave digital footprints through satellite images, bio-medical fields, smartphones, social media, and other applications. Rapidly growing technology has led to exponential increase in machine-generated data. Big Data represents a new era in data exploration and utilization such that it contains data that is high in volume, variety and velocity. Modern advances in software engineering have led to deploying software as services (e.g., SaaS), which provides a significant advantage for organizations to focus on core businesses instead of expanding resources on computer infrastructure and maintenance. For example, 'big-data' clustering software as a service that employs a set of data instances as input, can perform computations for data clustering and return partitioned data to a client as an output. Big data can be used in many scenarios for data mining such as for example tracking generated content in social media, analyzing web page images from the web and census data, obtaining required data from Internet of Things (IoT) sensors, and activity tracking from smartphones and network traffic data for cyber-security. As big data becomes ubiquitous in data analytics, demand for data sampling and data dimension features rapidly grow. Thus, as an essentially primitive, quantum computing is receiving ever increasing attention.

Quantum computing is generally use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits that comprise superpositions of both 0 and 1, can entangle multiple quantum bits, and use interference. Superconducting qubits offer a promising path toward constructing fully-operational quantum computers as it can exhibit quantum-mechanical behavior (allowing to be used for quantum information processing) at a macroscopic level (e.g., designed and fabricated by existing integrated circuit technologies). A quantum computation uses a qubit as its essential unit instead of a classical computing bit. The qubit (e.g., quantum binary digit) is the quantum-mechanical analogue of the classical bit. Whereas classical bits can take on only one of two basis states (e.g., 0 or 1), qubits can take on superpositions of those basis states (e.g., $\alpha|0\rangle + \beta|1\rangle$, where $\alpha$ and $\beta$ are complex scalars such that $|\alpha|^2+|\beta|^2=1$), allowing a number of qubits to theoretically hold exponentially more information than a same number of classical bits. Thus, quantum computers (e.g., computers that employ qubits instead of solely classical bits) can, in theory, quickly solve problems that can be extremely difficult for classical computers. The bits of a classical computer are simply binary digits, with a value of either 0 or 1. Almost any device with two distinct states can serve to represent a classical bit: a switch, a valve, a magnet, a coin, etc. Qubits, partaking of the quantum mystique, can occupy a superposition of 0 and 1 states. It's not that the qubit can have an intermediate value, such as 0.63; when the state of the qubit is measured, the result is either 0 or 1. But in the course of a computation, a qubit can act as if it were a mixture of states—for example: 63 percent 0 and 37 percent 1.

By processing information using laws of quantum mechanics, quantum computers offer novel ways to perform computation tasks such as molecular calculations, financial risk calculations, optimization and many more. General quantum programs require coordination of quantum and classical parts of a computation. One way to think about general quantum programs is to identify processes and abstractions involved in specifying a quantum algorithm, transforming the algorithm into executable form, running an experiment or simulation, and analyzing the results. A notion throughout these processes is use of intermediate representations. An intermediate representation (IR) of a computation is neither its source language description nor the target machine instructions, but something in between. Compilers may use several IRs during a process of translating and optimizing a program. The input is source code describing a quantum algorithm and compile time parameter(s). The output is a combined quantum/classical program expressed using a high-level IR. A distinction between a quantum and classical computer is that the quantum computer is probabilistic, thus measurements of algorithmic outputs provide a proper solution within an algorithm specific confidence interval. The computation is then repeated until a satisfactory probable certainty of solution can be achieved.

In today's quantum world, as big data becomes prevalent in data analytics, demand for data sampling and data dimension features rapid grow. Moreover, a desire to analyze how noise and error in quantum computing effect quantum circuit results is highly desirable. Thus, as an essential primitive, visual representation of errors is receiving increasing attention. During this Noisy Intermediate Scale Quantum (NISQ) era of Quantum computing, noise is inevitable. Thus, to be able to communicate and analyze how noise can affect a quantum circuit is a vital aspect. Currently, understanding the concepts and math to quantify the effect of noise is a significant subject. By creating a visual representation of noise, it is easier to understand this complex phenomenon. It can be advantageous to create a visual representation of such noise to glean more accurately quantum specific limitations. Quantum computing errors can introduce classical uncertainty regarding quantum states. Software visualization aims to represent graphically software such as algorithms, source codes, runtime data and error patterns. These dynamic software visualizations assist to explore behavior of a program at run-time and help to understand what the program is doing to identify potential or actual performance bottlenecks. Many quantum computers have a likelihood to inherit noisy components hence any scalable quantum computer may require quantum error correction and fault-tolerance methods of computation or visualization. The need to determine component failure probabilities especially fault-tolerance threshold for gate and memory components is significant in order to optimize these circuits and modify scalability accordingly. If failure rates are below a set threshold then arbitrarily reliable computations in a quantum circuit are achievable. Hence, embodiments described and claimed herein provide a unique methodology in quantum computing to understand how noise and error implicate circuit results. By visualizing qubit relaxation (T1), a better understanding can be provided of how to optimize a quantum circuit to represent and account for errors caused by qubit relaxation.

In these embodiments, functionality to visualize quantum circuit metrics is proposed. A quantum computer can potentially solve certain problems more efficiently than a classical computer. However, quantum computers are likely to be engineered from inherently noisy components, so any scalable quantum computer system may require quantum error correction and fault-tolerant methods of computation. Thus, an aspect of embodiments disclosed herein is to visually represent how qubit relaxation (T1) and other measurements can be represented to better understand how to optimize a quantum circuit. An aim is to analyze circuits for improved debugging and optimization as applied to quantum circuits. Qubits exponentially relax back to ground state at a rate inversely proportional to a characteristic time constant (T1). Circuits composed of gates take time to execute on these qubits. The longer a circuit executes, the more that qubit relaxation can negatively affect results. A visualization can be created to represent this impact using T1 and gate execution times of a qubit. Besides qubit relaxation, there are many other types of noise in a quantum system that factor into circuit error. These embodiments represent only one such visualizing system error as it affects quantum circuits. There are many different possibilities for visualizing various types of noises in this way to understand complexity of error(s) within quantum systems. Embodiments described herein can provide opportunity to visualize impact of relaxation time and have control of the visualization. Moreover, with a better understanding of error, quantum circuits can be better handled to be optimized for respective devices. By optimizing circuits in this manner, a dramatic improvement in quality of results can be achieved while having better understanding of how to represent and account for noise at a qubit and gate-level.

FIG. 1 illustrates a block diagram of an example system 100 that can access data and process that data using variable computing components depicted in accordance with one or more embodiments described herein. The system 100 can facilitate a process of assessing and identifying large amounts of various forms of data, using machine learning, and training a neural network or other type of model. The system 100 can also generate predictive recommendations to an individual level with context in accordance with one or more embodiments described herein. Aspects of systems (e.g., system 100 and the like), apparatuses or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform operations described herein. Repetitive description of like elements employed in one or more embodiments described herein is omitted for sake of brevity.

System 100 can optionally include a server device, one or more networks and one or more devices (not shown). The system 100 can also include or otherwise be associated with at least one processor 102 that executes computer executable components stored in memory 104. The system 100 can further include a system bus 106 that can couple various components including, but not limited to: (1) a simulation component 108 that simulates a quantum circuit; (2) a compiling component 110 that compiles the quantum circuit by unrolling more complex gates to a quantum processor's basis gates and mapping the complex gates to a topology of the quantum processor wherein the basis gates and the topology are properties of the quantum processor; (3) a determination component 112 that sets a desired threshold for percentage of qubit relaxation (T1) across the quantum circuit; (4) a receiving component 124 that receives the compiled quantum circuit from a classical computer; (5) a computing component 126 that can employ a qubit's T1 values and multiply it times the percent relaxation set to generate a new threshold for a qubit; (6) a transmitting component 128 that transmits the computed circuit to the classical computer; and (7) a visualization component 114 that generates a visualization of the qubit relaxation (T1) by altering visual appearance of a qubit based on the qubit relaxation (T1).

System 100 can be any suitable computing device or set of computing devices that can be communicatively coupled to devices, non-limiting examples of which can include, but are not limited to, a server computer, a computer, a mobile computer, a mainframe computer, an automated testing system, a network storage device, a communication device, a web server device, a network switching device, a network routing device, a gateway device, a network hub device, a network bridge device, a control system, or any other suitable computing device. A device can be any device that can communicate information with the systems 100 and/or any other suitable device that can employ information provided by system 100. It is to be appreciated that systems 100, components, models or devices can be equipped with communication components (not shown) that enable communication between the system, components, models, devices, etc. over one or more networks.

In accordance with the system 100, a memory 104 can store computer executable components executable by the processor 102. The simulation component 108 can simulate a quantum circuit. The simulation component uses qubit circuit simulation tool to create a Quantum circuit. The compiling component 110 compiles the quantum circuit by unrolling complex gates to the quantum processor basis gates and mapping the complex gates to a topology of the quantum processor wherein the basis gates and topology are properties of the quantum processor. The compiling component has a graphical user interface that allows a user to program Quantum circuits within the qubit circuit simulation. The determination component 112 sets a desired threshold for percentage of qubit relaxation (T1) across the quantum circuit. The receiving component 124 receives the compiled quantum circuit from a classical computer. Then the computing component 126 can employ a qubit's T1 values and multiply it times percent relaxation set to generate a new threshold for a qubit. The transmitting component 128 transmits the computed circuit to the classical computer. Lastly, the visualization component 114 generates a visualization of the qubit relaxation (T1) by altering visual appearance of a qubit based on the qubit relaxation (T1). As previously stated, the functionality of the components utilized by the embodiments will be covered in detail later in this document.

The various components of systems 100 can be connected either directly or via one or more networks. Such networks can include wired and wireless networks, including, but not limited to, a cellular network, a wide area network (WAN) (e.g., the Internet), or a local area network (LAN), non-limiting examples of which include cellular, WAN, wireless fidelity (Wi-Fi), Wi-Max, WLAN, radio communication, microwave communication, satellite communication, optical communication, sonic communication, or any other suitable communication technology. Moreover, the aforementioned systems and/or devices have been described with respect to interaction between several components. It may be appreciated that such systems and components can include those components or sub-components specified therein, some of the specified components or sub-components, and/or additional components. Sub-components can also be implemented as components communicatively coupled to other components rather than included within parent components. Further yet, one or more components and/or sub-components can be combined into a single component providing aggregate functionality. The components can also interact with one or more other components not specifically described herein for the sake of brevity, but known by those of skill in the art.

The subject computer processing systems, methods apparatuses and/or computer program products can be employed to solve new problems that arise through advancements in technology, computer networks, the Internet and the like.

Quantum computing has the potential to revolutionize many industries such as pharmaceuticals, materials research to finance and logistics by contributing a unique way of processing information with the use of the quantum mechanical systems. In order to store and process the information, qubits are used. These qubits are notoriously fragile such that they can lose information easily through interactions within an environment. Adding to that, it is equivalently difficult to isolate a quantum system from noise control. Unlike classical computers, quantum computers cannot rely on redundancy to prevent errors. Moreover, state of a qubit can be a linear superposition of |0⟩ and |1⟩ and any error correction can preserve a qubit's additional phase information. A quantum error-correcting code is analyzed typically using a stochastic, Pauli channel error model that describes noise on physical qubits. A stochastic error can be described as a possibility that an outcome is not as expected even if a model and parameters are correct. This type of error can be estimated via simulation or by calculating relevant mathematical distribution. As such, it is a most commonly described error, however, it is not necessarily most significant. Coherent errors on physical data qubits result in both physical and logical error rates; these error rates differ from those predicted by a Pauli method. Moreover, quantum computing was considered impractical because of inability to control qubits without errors. Hence, these embodiments emphasize tools that can be employed to analyze quantum experience at a deeper level than available conventionally. Through embodiments disclosed herein, visualization can be generated that can help analyze how quantum circuits can perform well on a quantum computer. Moreover, the visualizations can also facilitate understanding how to optimize a circuit based on observations.

Figure 2:
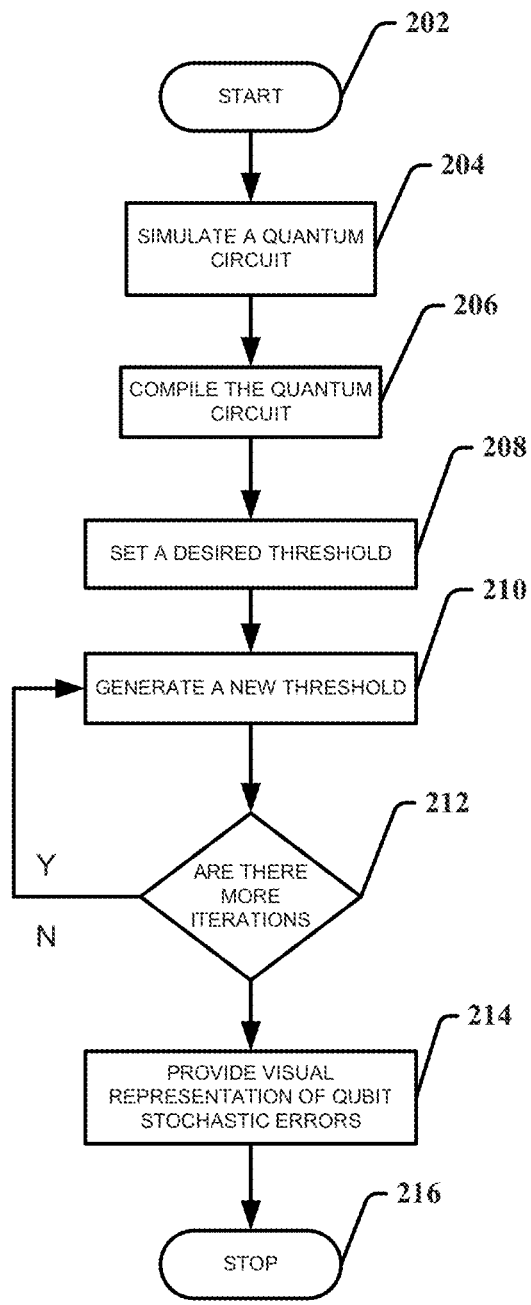
FIG. 2 illustrates an example flow chart of an efficient visual representation of qubit stochastic errors in a quantum computer.

FIG. 2 illustrates an example flow chart of an efficient visual representation of qubit stochastic errors in a quantum computer. The method describes a process of creating a visual representation of qubit stochastic errors to assist in analyzing and optimizing performance of a quantum circuit. The process starts at 202 wherein a simulation component uses qubit circuit simulation tool to create a Quantum circuit as denoted by block 204. Upon simulation, the quantum circuit is compiled by unrolling complex gates to a quantum processor's basis gates and mapping the complex gates to a topology of the quantum processor wherein the basis gates and the topology are properties of the quantum processor as denoted by block 206. The compiling component has a graphical user interface that allows a user to program Quantum circuits within the qubit circuit simulation. For further explanation referencing FIG. 3, U1, U2, U3, CX and ID are a set of gates corresponding respectively to one, two, and three-parameter single qubits gates, controlled-NOT gates and identify gates. Complex gates refer to gates the algorithm is set to run which can be gates such as swap, controlled-phase, Toffoli, and can be requested on qubits that are not directly connected in the device's topology. Unrolling refers to a process of mapping the gates requested in the algorithm onto gates that the device can actually run. The desired threshold is set for a percentage of qubit relaxation (T1) across the quantum circuit as denoted by block 208. A qubit's T1 value can be multiplied by percent relaxation set to generate a new threshold for a qubit as denoted by block 210. If there are more iterations at block 212, then the process is repeated from block 210 wherein a new threshold is generated else, the visualization may stop at the end of the circuit and a visual representation of qubit stochastic errors is presented as denoted by block 214 and thus completes the process at 216. Thus, visualization is generated of the qubit relaxation (T1) by altering visual appearance of a qubit based on qubit relaxation. While these embodiments refer to T1 for a concrete embodiment, the same approach can be used to visualize other types of stochastic noise affecting quantum circuits. Hence, through this process, a quantum program can be constructed with a graphical interface, and then run on real devices.

Figure 3:
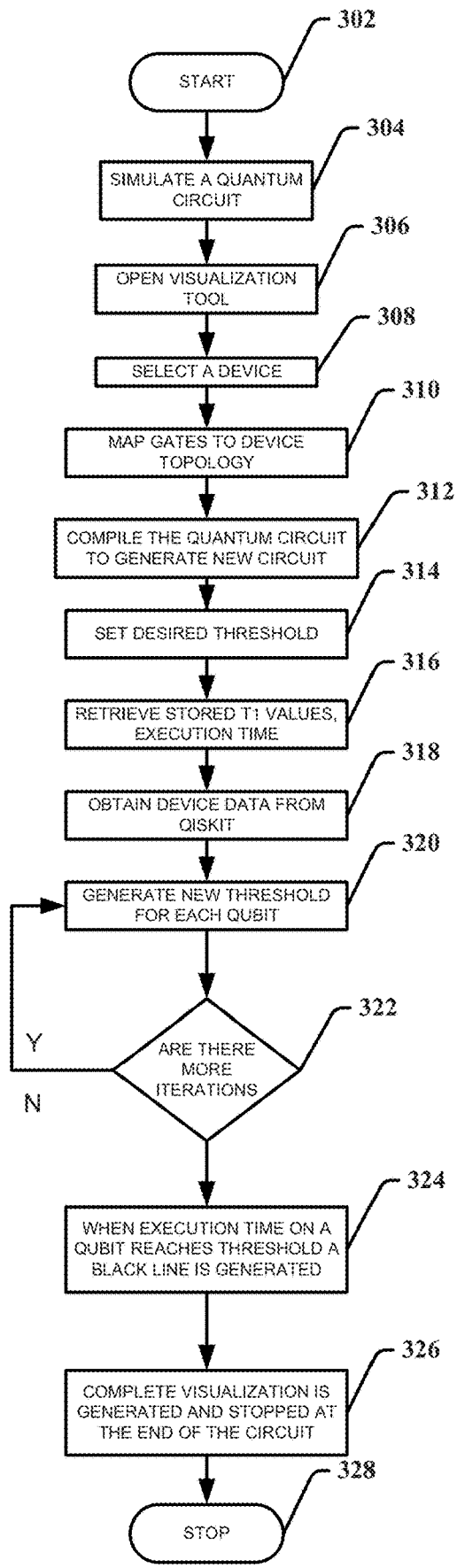
FIG. 3 illustrates an example detailed flow chart of an efficient visual representation of qubit stochastic errors in a quantum computer.

FIG. 3 illustrates an example detailed flowchart of an efficient visual representation of qubit stochastic errors in a quantum computer. The process starts from 302 where a quantum circuit is simulated using a graphical user interface as denoted by block 304. Upon opening the visualization tool as denoted by block 306, a device is selected from a predetermined list as denoted by block 308. Once a device is selected, gates are mapped to a topology as denoted by block 310 and the system can compile a circuit by unrolling more complex gates to the device's basis gates and mapping these to the selected device's topology. Thus, a new circuit can be generated in the tool as denoted by block 312. Next to the output circuit, there is a slider that can be used to set a desired threshold for percentage of qubit relaxation (T1) across the circuit as denoted by block 314. Upon selecting a device, the system can retrieve stored T1 values for a qubit on the device and also retrieve execution times for the basis gates on a qubit of the device as denoted by block 316. Moreover, the device's data is also pulled from a quantum information science kit (Qiskit) as denoted by block 318. For a gate that is brought out of ground state, a new threshold value is generated as denoted by block 320. Upon processing this step, the system can proceed through a vertical column in the circuit to determine a gate with longest execution time. It may take this time and perform calculations to obtain a redness value for a qubit and build a visualization accordingly. For a subsequent vertical step that has qubits, the system can again proceed through and choose a maximum execution time within the column and add this sum to a sum of maximum times of previous steps mentioned in the section above. This time can be divided by a threshold of an active qubit thus repeating the process from block 320 depending on number of iterations at block 322. If there are no more iterations and when execution time reaches a threshold as denoted by block 324, a line (e.g., black line) is generated behind the gate. For any subsequent columns throughout the circuit, it can be rendered in a different color such as for example: gray. This can bring the visualization to completion at the end of the circuit as denoted by block 326 and thus completes the process at 328. Through this process, an enhanced visualization is created which evinces how quantum circuits can perform well on a quantum computer. These visual observations are also significant to optimize the quantum circuit for optimal results. Through this technique, a circuit can be shortened and designed to be more predictable.

Figure 4:
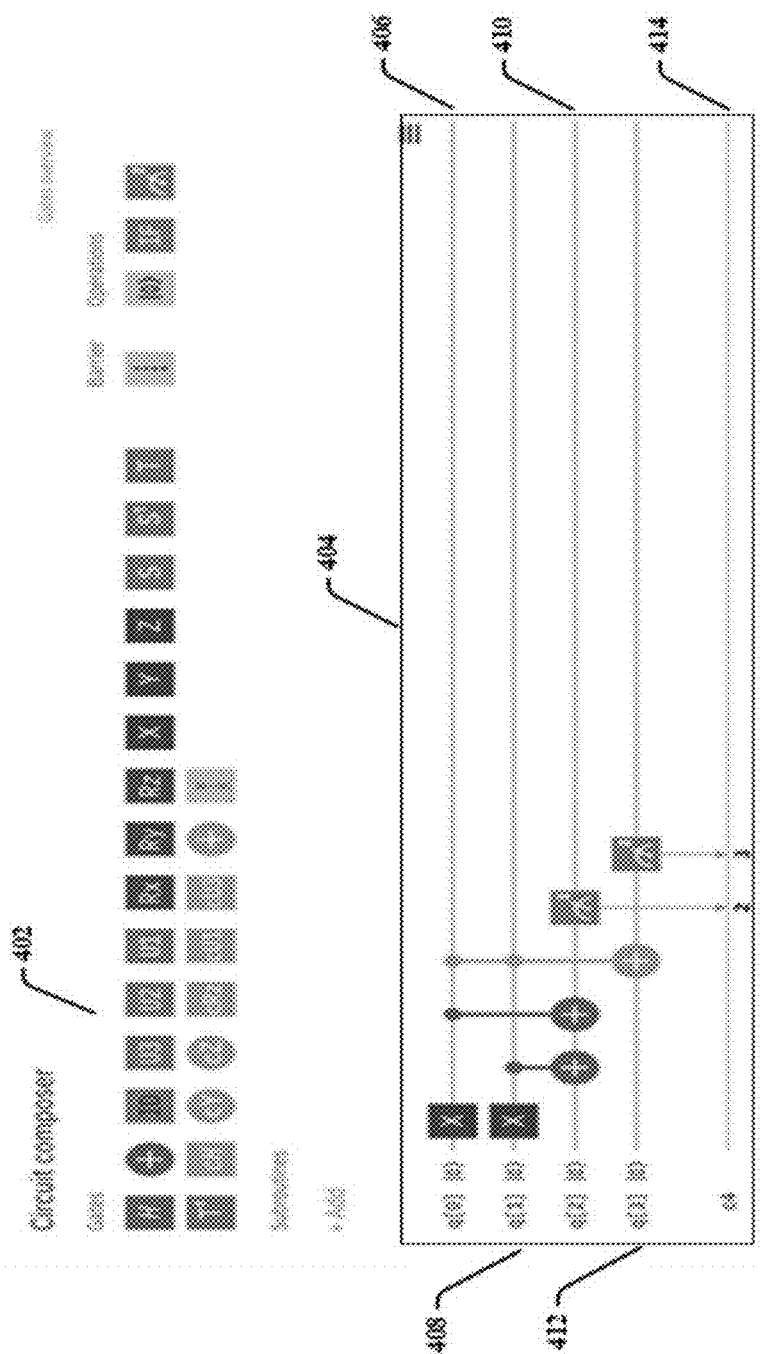
FIG. 4 illustrates an example of a circuit composer to generate a quantum circuit.

FIG. 4 illustrates an example of a circuit composer that can generate a quantum circuit. A circuit composer is a tool that allows to visually learn how to create quantum circuits. A circuit composer contains gates as denoted by block 402. It depicts a story of what happens to qubits during a program, e.g., from left to right. It shows the circuit composer, where the tool allows to drag and drop quantum operations onto a circuit. A quantum logic gate is a rudimentary quantum circuit operating on a small number of qubits. The basic operations of computing are known as gates. To manipulate an input state of a circuit, the basic operations of quantum computing need to be applied. These are known as quantum gates. The basis gates and topology of a quantum circuit refer to the properties of the quantum processor. The basis gates are natively supported by physical hardware. As shown in block 402, there are various gates with a specific purpose of a gate in a quantum circuit. The H or Hadamard gate rotates states |0⟩ and |1⟩ to |+⟩ and $|-\rangle$, respectively. It is useful for making superpositions. As a Clifford gate, it is useful for moving information between x and z bases. The controlled-X gate ($C_X$) is also known as the controlled-NOT. It acts on a pair of qubits, with one acting as a control qubit and the other as a target qubit. It performs an X on the target whenever the control is in state $|1\rangle$. If the control qubit is in a superposition, this gate creates entanglement. The identity gate (ID) is the absence of a gate. It ensures that nothing is applied to a qubit for one unit of gate time. U1, U2 and U3 gates are three physical gates. The three parameters in the U3 gate allow construction of any suitable single qubit gate and has duration that is twice as long as U2. The two parameters control in the U2 gate have two different rotations within the gate with a duration of one unit of gate time. The U1 gate is equivalent to Rz and this can be implemented by control software, requiring no actual manipulation of the qubits and has duration of zero. The Rx and Ry gates require a single parameter wherein an angle is expressed in radians. The Pauli X gate has a property of flipping the $|0\rangle$ state to $|1\rangle$ and vice versa. It is equivalent to Rx for angle π. The Pauli Y gate is equivalent to Ry for angle π. It is also equivalent to a combined effect of X and Z. The Pauli Z gate has a property of flipping the $|+\rangle$ to $|-\rangle$ and vice versa. It is equivalent to Rz for angle π. The S gate is equivalent to Rz for angle π/2. As a Clifford gate, it is useful for moving information between the x and y bases and it is an inverse of the S gate which is equivalent to Rz for angle −π/2. The T gate is equivalent to Rz for angle π/4. Fault-tolerant quantum computers may compile quantum programs down to just the T gate and its inverse, as well as the Clifford gates. The inverse of the T gate is equivalent to Rz for angle −π/4. The controlled-Hadamard gate, like the controlled-NOT, acts on a control and target qubit. It performs an H on the target whenever the control is in state $|1\rangle$. The controlled-Y gate, like the controlled-NOT, acts on a control and target qubit. It performs a Y on the target whenever the control is in state $|1\rangle$.

The controlled-Z gate, like the controlled-NOT, acts on a control and target qubit. It performs a Z on the target whenever the control is in state $|1\rangle$. The controlled-Rz gate (cRz), like the controlled-NOT, acts on a control and target qubit. It performs a Rz rotation on the target whenever the control is in state $|1\rangle$. The controlled-U1 gate (cU1), like the controlled-NOT, acts on a control and target qubit. It performs a Rz rotation on the target whenever the control is in state $|1\rangle$. The controlled-U3 gate (cU3), like the controlled-NOT, acts on a control and target qubit. It performs a Rz rotation on the target whenever the control is in state $|1\rangle$. The ccX gate, commonly known as the Toffoli, has two control qubits and one target. It applies an X to the target only when both controls are in state $|1\rangle$. The SWAP gate simply swaps the states of two qubits and to make a quantum program more efficient, the compiler may try to combine gates. The barrier is an instruction to the compiler to prevent these combinations from being made. The reset operation returns a qubit to state $|0\rangle$, irrespective of its state before the operation was applied and thus it is not a reversible operation. The IF operation allows quantum gates to be conditionally applied, depending on state of a classical register. A measurement in a standard basis is also known as a z basis or computational basis. This can be used to implement any suitable type of measurement when combined with other gates and it is not a reversible operation. Through the use of these gates, quantum logic can be put together and the result is a quantum circuit as denoted by block 404. In this circuit, four qubits have been set up and numbered from 0 to 3. A measure operation is then immediately applied to the qubits, which simply extracts an output of 0 or 1 from each. A gate is placed in the circuit such that block 406 and 408 labeled as q[0] and q[1] have Pauli X gate. Block 410 shows the CX gate toggle from q[0] to q[1] and q[1] to q[2]. Similarly, CX gate is added at block 412 to toggle from q[0] to q[3]. In order to read out results of the computation, the qubits are measured as denoted by block 414 to both q[2] and q[3]. An individual backend system is used to compile this circuit. It may take some of the gates such as q[3] gate to unpack the circuit such that the circuit fits in the hardware. In quantum computing, the length of the quantum circuit can exponentially degrade performance of the circuit. Thus, it is significant to perform this analysis to obtain optimal results.

Figure 5:
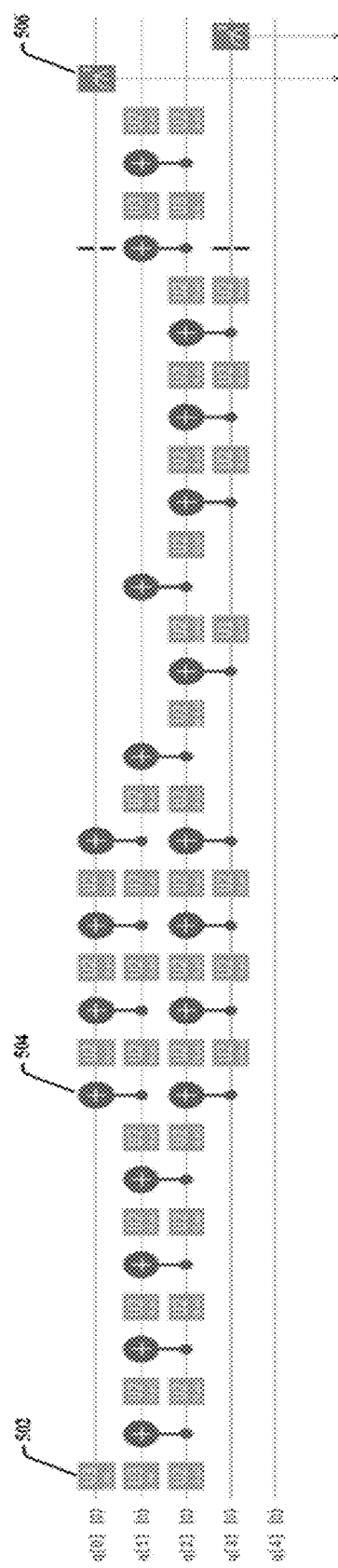
FIG. 5 illustrates an example of a final composed quantum circuit.

FIG. 5 illustrates an example of a result of a composed quantum circuit. Even though the figure mentioned in the above section (FIG. 4) shows a very simple circuit, once it is unraveled, the new circuit is shown in FIG. 5. Upon composing a quantum circuit, the visualization tool is opened and a device is selected from a predetermined list. A sample device list is ibmqx4 in ibm-q/open/main, ibmqx4 in ibm-q/open/main, ibmq_qasm_simulator in ibm-q/open/main, ibmqx2 in ibm-q/open/main and ibmq_16_melbourne in ibm-q/open/main. Once a device is selected from the list above, the system can compile the circuit by unrolling more complex gates to the device's basis gates and map these to the selected device's topology. The new circuit is thus presented in the tool. Back-end availability and functionality can vary depending on the account and device selected. If the device ibmqx4 in ibm-q/open/main is chosen, then a first quantum circuit is built. In this elaborated circuit, the gates are now represented by one of three physical gates U1/U2/U3 as denoted by block 502. Based on parameters control, different rotations are employed within the gate throughout the circuit. U1 has a duration of zero whereas U2 and U3 have duration of one unit of gate time. An example of a Qasm reference for these parameters is: u3(π/2, π/2, π/2) q[0], u2(π/2, π/2) q[0] and u1(π/2) q[0]. Moreover, ccX gate as denoted by block 504 is also elaborated throughout the circuit with mostly two control qubits and one target where one acts as the control qubit (this is the one with the little dot) and the other acts as the target qubit (with the big circle). It applies an X to a target only when both controls are in state $|1\rangle$. An example Qasm reference for ccX can be denoted as ccx q[0], q[1], q[2]. The dashed lines in the circuit distinguish different parts of the circuit. It is made by dragging and dropping a 'Barrier', or by using a line barrier q in the Qasm editor. The result can be a string of two bits as denoted by block 506, which can be read out from the qubits 0 and 3. An example of a Qasm reference for the z measurement gate is measure q[0]. The z measurement represents only one of a multitude of number of possible manners to measure a qubit. One of the most significant aspects of qubits is how these two kinds of measurements relate to each other. To elaborate on this notion, single-qubit or multi-qubit circuits can be constructed on a composer such as the one described in FIG. 5. Hence, FIG. 4 is a circuit being built based on the algorithm written and FIG. 5 is the same circuit prepared for a specific device's topology and is an end result. As noted above, unrolling refers to a process of mapping gates requested in the algorithm onto gates that the device can actually run. Unrolling of gates is an established technique well known by those skilled in the art, and further discussion related thereto is omitted for sake of brevity.

Figure 6A:
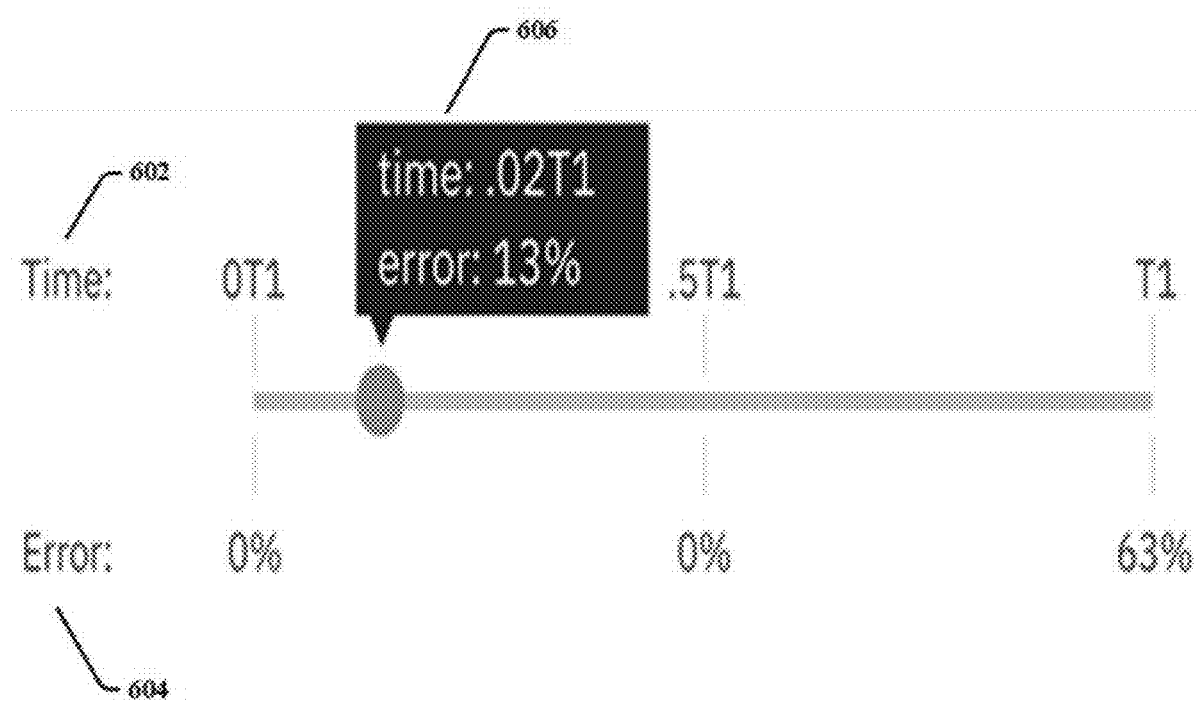
FIG. 6A illustrates an example of setting a desired threshold for a percentage of qubit relaxation across a quantum circuit.

FIG. 6A illustrates an example of setting a desired threshold for the percentage of qubit relaxation across the quantum circuit. Upon composing a new circuit, next to an output circuit, there is a slider that can be used to set a desired threshold for percentage of qubit relaxation (T1) across a quantum circuit. This threshold can for example be preset at 50% as a default which translates to largely unreliable results. Upon setting the circuit to a correct threshold, the visualization can be updated automatically. It is trivial to predict error rate that is acceptable in a circuit based on the way a quantum circuit is designed. The subject of error and uncertainty is and has been a significant issue in quantum computing. In the Noisy Intermediate Scale Quantum (NISQ) era of Quantum computing, noise is inevitable. Moreover, in some circuits, it is acceptable to have an error rate of 42% whereas in other circuits that rate might be too high. Hence, it is advisable to set a threshold rate such that performance of a circuit can be interpreted accordingly. For a time period (T1) as denoted by block 602, a percentage of error (%) as denoted by block 604 can be assigned. For example, a threshold is set to 13% for 0.02T1 time as denoted by block 606. Through this way, during a circuit analysis, the transition of qubits moves to the next stage upon reaching the threshold that is set. Upon setting a threshold and selecting a device, the system can retrieve stored T1 values for a qubit on the device. It can also retrieve the execution times for the basis gates on a qubit of the device. The device's data is pulled from the back-end through quantum information science kit (Qiskit). Qiskit is an open-source framework that facilitates access to real quantum computing. It helps to work with noisy quantum computers at the level of pulses, circuits and algorithms. This kit may provide information about execution time for one of these gates to run and the T1 qubit relaxation time for execution. Sample data is more formally presented in FIG. 6B. It can be seen from the data in FIG. 6B that for the device ibmqx4, qubits q[0], q[1], q[2], q[3] have a specific T1 value. Moreover, the three physical gates u1/u2/u3 has its corresponding time assigned as well. These data sets can be added together and can apply a gradient over the qubits to establish a detailed circuit for further calculations and thus be able to analyze the performance of the circuit at a granular level.

Figure 7:
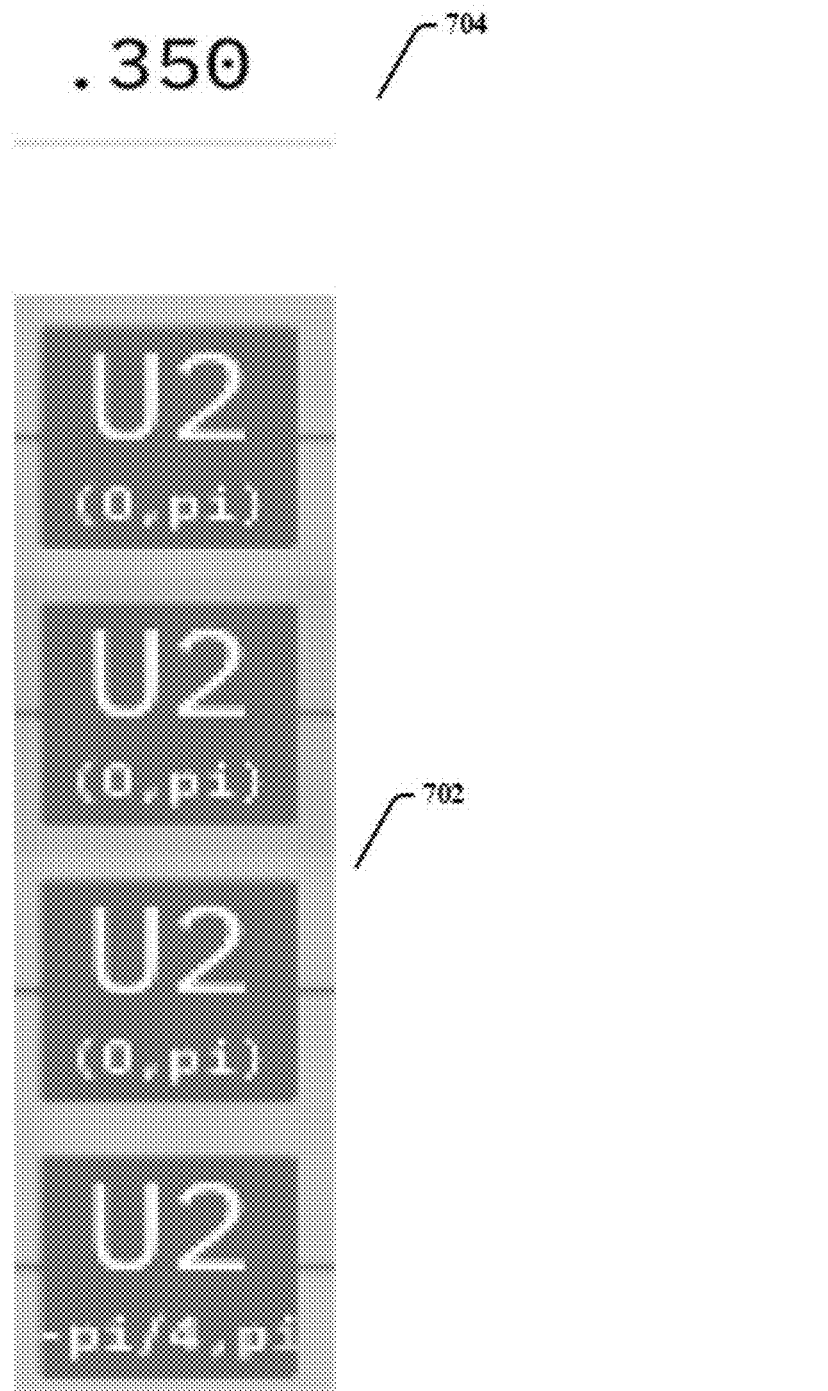
FIG. 7 illustrates an example of a system analyzing a circuit to generate a visualization.

FIG. 7 illustrates an example of a system computing a circuit to generate a visualization. For the qubits where gates have been brought out of the ground state are called as active state in these embodiments. These embodiments can take qubit's T1 value and multiply it times the percent relaxation that is set as per the threshold value to generate a new threshold for a qubit. To generate a visualization, these embodiments may go through the first vertical column in the circuit as denoted by 702 to determine the gate with the longest execution time. This is executed at a specific column timestamp of 0.350 μs as denoted by block 704. It can then take that time and divide it by the threshold of active qubits to generate a redness value for a qubit at that step. This equation employs the form:

$$1 - \exp\left[-\frac{t}{T_1}\right]$$

where t is total circuit length. Redness value can be of any suitable color however in these embodiments it is referred to as red. This value can obtain a shaded square behind a gate and if a qubit is active but missing a gate at a step, the redness value can still be generated and applied in the empty space. For a subsequent vertical step that has qubits, the system can again proceed through and pick a maximum execution time within the column. It can add this sum to the sum of the maximum times of the previous steps mentioned in the above sections and divide that time by a threshold of an active qubit, thus repeating the process from the time a new threshold is generated for a qubit. As the steps progress, this can create a gradient effect across a qubit of the circuit.

Figure 8:
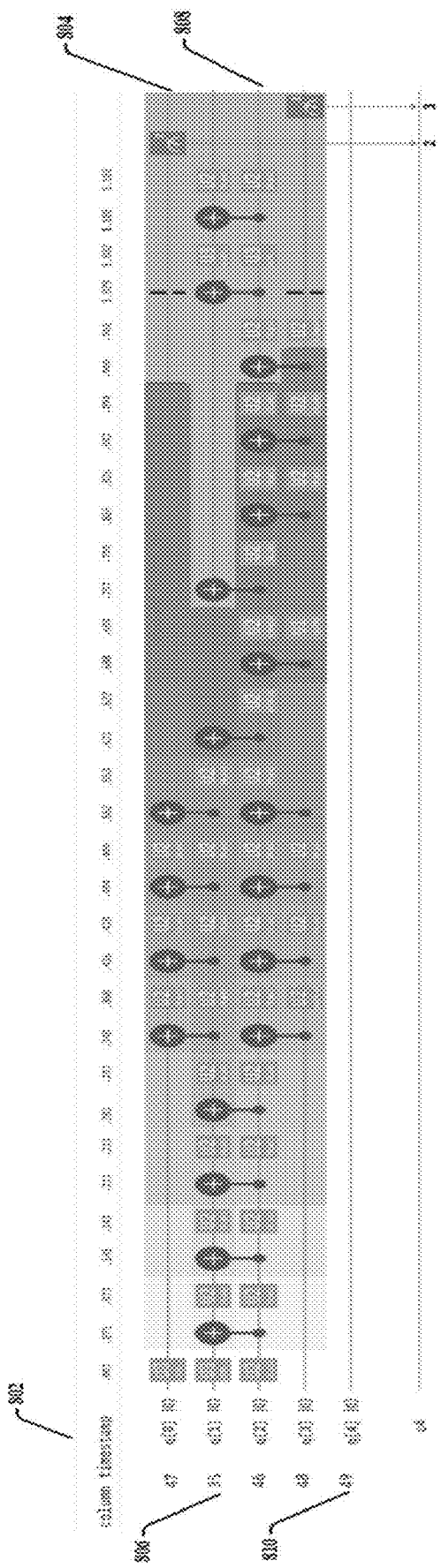
FIG. 8 illustrates an example of a gradient effect across a qubit of a circuit.
Figure 9:
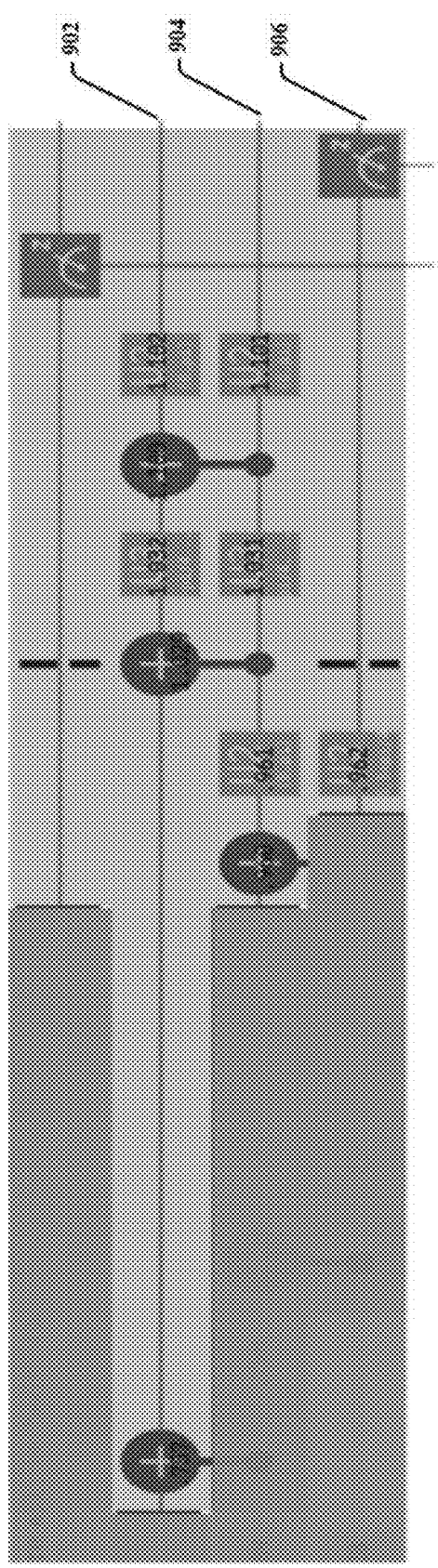
FIG. 9 illustrates an example qubit threshold.

FIG. 8 illustrates an example of a gradient effect across a qubit of the circuit. Upon executing the step mentioned in the above section for a vertical column in the circuit, a complete visualization circuit is presented along with a column timestamp as denoted by block 802. The transition from one stage (color-coded) to another for one qubit is based on a threshold or at the stage of T1 that is set for a qubit. FIG. 7 is focused on one particular column where FIG. 8 is a combined result of the columns in a circuit. For q[0], when the execution time reached the threshold point at approximately 0.894 μs, a black line is generated, and the rest of the circuit is rendered gray as denoted by block 804. For q[1] as denoted by block 806, it is a qubit that has lower performance so the threshold occurs sooner at approximately 0.689 μs. This might be a problematic concern if it is analyzed further. However, qubits q[2] and q[3] as denoted by block 808 and 810 have a threshold set to later timing approximately near 0.894 μs and 0.960 μs as it is a better performing qubit. Thus, for these qubits, corresponding threshold points are illustrated in FIG. 9, and it can be seen that q[1] has a 0.757 threshold point as denoted by block 902 hence a black line may be generated on the right side of the shaded box behind that gate. Qubits q[2] and q[3] have threshold points 0.960 and 0.962 as denoted by block 904 and 906 hence its performance is better. When the execution time on a qubit reaches the threshold set by the user, a black line is generated on the right side of the shaded box behind that gate. For any subsequent columns throughout the rest of the circuit, the background of that qubit can be rendered gray. The visualization can stop at the end of the circuit. It is to be appreciated that any suitable combination of coloring, shading, hatching, etc. can be utilized to convey the functionality described above.

Through this process illustrated in the section above, an enhanced visualization is generated to portray how proficient circuits can perform on a quantum computer. These embodiments visualize stochastic errors accumulated throughout a circuit using a gradient overlay. The major focus is on visualizing error on a universal gate-based quantum circuit. By visualizing stochastic error, it may aid in quantum circuit creation and thus the analysis may assist to optimize the circuit such that the performance of a quantum circuit can be more predictable. Through this optimization, quality of the circuits can be improved dramatically and users can have a better understanding of how to represent and account for noise at a qubit and gate level. A challenge is to understand how a circuit can be negatively impacted by noise after it is compiled into a form that can be run on a real quantum chip. Thus, embodiments described herein facilitate visualizing noise associated with a circuit as it exists on real NISQ hardware. Such functionality can aid in visualizing circuit metrics and facilitate analyzing circuits for improved debugging and optimization. Also, this visualization can help explain understanding qubit relaxation and other measurements.

Figure 10:
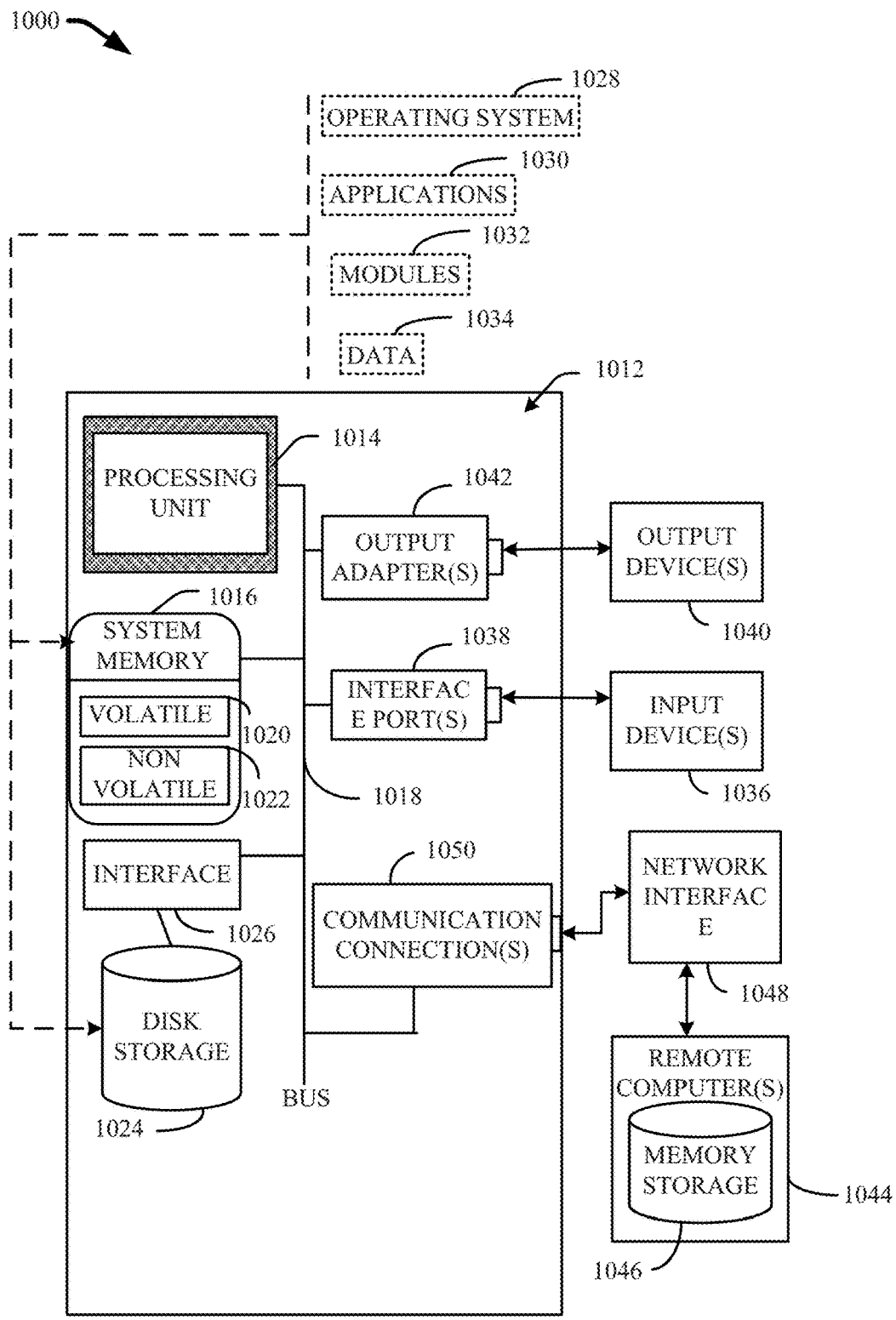
FIG. 10 illustrates a schematic diagram of an example operating environment in accordance with one or more implementations described herein.

FIG. 10 illustrates a suitable operating environment 1000 for implementing various aspects of this disclosure can also include a computer 1012. The computer 1012 can also include a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014. The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1094), and Small Computer Systems Interface (SCSI). The system memory 1016 can also include volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), flash memory, or nonvolatile random-access memory (RAM) (e.g., ferroelectric RAM (FeRAM). Volatile memory 1020 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1012 can also include removable/non-removable, volatile/non-volatile computer storage media. FIG. 10 illustrates, for example, a disk storage 1024. Disk storage 1024 can also include, but is not limited to, devices like a magnetic disk drive, floppy disk drive, tape drive, Jaz drive, Zip drive, LS-100 drive, flash memory card, or memory stick. The disk storage 1024 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used, such as interface 1026. FIG. 10 also depicts software that acts as an intermediary between users and the basic computer resources described in the suitable operating environment 1000. Such software can also include, for example, an operating system 1028. Operating system 1028, which can be stored on disk storage 1024, acts to control and allocate resources of the computer 1012. System applications 1030 take advantage of the management of resources by operating system 1028 through program modules 1032 and program data 1034, e.g., stored either in system memory 1016 or on disk storage 1024. It is to be appreciated that this disclosure can be implemented with various operating systems or combinations of operating systems. A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It can be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a computer, a server, a router, a network PC, a workstation, a microprocessor-based appliance, a peer device or other common network node and the like, and typically can also include many or all the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1050 refers to the hardware/software employed to connect the network interface 1048 to the system bus 1018. While communication connection 1050 is shown for illustrative clarity inside computer 1012, it can also be external to computer 1012. The hardware/software for connection to the network interface 1048 can also include, for exemplary purposes only, internal and external technologies such as, modems including regular telephone grade modems, cable modems and DSL modems, ISDN adapters, and Ethernet cards.

Embodiments of the present invention may be a system, a method, an apparatus and/or a computer program product at any possible technical detail level of integration. The computer program product can include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in one or more computing/processing device receives computer readable program instructions from the network and forwards the computer readable program instructions for storage in a computer readable storage medium within the respective computing/processing device. Computer readable program instructions for carrying out operations of various aspects of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to customize the electronic circuitry, to perform aspects of the present invention.

Aspects of the present invention are described herein with reference to flowchart illustrations and/or block diagrams of methods, apparatus (systems), and computer program products according to embodiments of the invention. It can be understood that one or more blocks of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, one or more blocks in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It can also be noted that one or more block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art can recognize that this disclosure also can or can be implemented in combination with other program modules. Generally, program modules include routines, programs, components, data structures, etc. that perform particular tasks and/or implement abstract data types. Moreover, those skilled in the art can appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not many aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a server computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings may generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random-access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems, computer program products, and computer-implemented methods. It is, of course, not possible to describe every conceivable combination of components, products and/or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a memory that stores computer executable components; and
a classical processor that executes the following computer executable components:
a simulation component that simulates a quantum circuit;
a compiling component that compiles the quantum circuit by unrolling complex gates to a quantum processor's basis gates and mapping the complex gates to a topology of the quantum processor wherein the basis gates and the topology are properties of the quantum processor;
a determination component that assigns a desired error threshold per a percentage of a qubit relaxation time across the quantum circuit; and
a visualization component that generates a visualization of the qubit relaxation time by automatically updating the visual appearance of a qubit based on and upon assignment of the desired error threshold per the qubit relaxation time, wherein the visualization component also generates the visualization of qubit stochastic errors accumulated throughout the quantum circuit using a gradient overlay, wherein the visualization displays a gradient effect across a qubit of the quantum circuit wherein the visualization circuit is presented along with a timestamp and a transition from one stage to another for the qubit is color-coded or illustrated by another visual indicator.

2. The system of claim 1, wherein the simulation component selects a device while building the quantum circuit.

3. The system of claim 1, wherein the determination component retrieves stored T1 qubit relaxation time values for a qubit on the device.

4. The system of claim 3, wherein the determination component retrieves execution times for the respective basis gates on the qubit of the quantum circuit.

5. The system of claim 1, wherein the visualization component renders the visualization to an altered layout and stops the visualization at an end of the quantum circuit based on a determination that the execution time on the qubit reaches the desired error threshold.

6. The system of claim 5, wherein the visualization represents and accounts for an error caused by a qubit relaxation time based on the altered visual appearance of the quantum circuit.

7. A computer-implemented method comprising:
simulating, using a classical processor, a quantum circuit;
compiling, using the classical processor, a quantum circuit by unrolling complex gates to a quantum processor's basis gates and mapping the complex gates to a topology of the quantum processor wherein the basis gates and the topology are properties of the quantum processor;
assigning, using the classical processor, a desired error threshold, wherein the desired error threshold is assigned for a percentage of a qubit relaxation time across the quantum circuit; and
generating, using the classical processor, a visualization of the qubit relaxation time by altering visual appearance of a qubit based on the desired error threshold assigned for the percent of the qubit relaxation time.

8. The method of claim 7, further comprising selecting, using the classical processor, a device while building the quantum circuit.

9. The method of claim 7, further comprising retrieving, using the classical processor, a stored qubit relaxation time (T1) for a qubit on the device.

10. The method of claim 9, further comprising retrieving, using the classical processor, execution times for the respective basis gates on a qubit of the quantum circuit.

11. The method of claim 7, further comprising rendering, using the classical processor, the visualization to an altered layout when execution time on a qubit reaches a threshold and then stopping the visualization at an end of the quantum circuit.

12. The method of claim 11, further comprising representing and accounting, using the classical processor, for errors caused by qubit relaxation time based on altered visual appearance of the quantum circuit.

13. The method of claim 12, further comprising generating, using the classical processor, a visualization of qubit stochastic errors accumulated throughout the quantum circuit using a gradient overlay and of the impact on the performance of the quantum circuit.

14. A computer program product comprising a computer readable storage medium having program instructions embodied therewith, the program instructions executable by a classical processor to cause the classical processor to:
simulate, using the classical processor, a quantum circuit;
compile, using the classical processor, a quantum circuit by unrolling complex gates to a quantum processor's basis gates and mapping the complex gates to a topology of the quantum processor wherein the basis gates and the topology are properties of the quantum processor;
determine, using the classical processor, a desired threshold for percentage of a qubit relaxation time across the quantum circuit; and
visualize, using the classical processor, the qubit relaxation time by altering visual appearance of a qubit based on the desired threshold for the qubit relaxation time.

15. The computer program product of claim 14, further comprising program instructions executable by a classical processor to cause the processor to select a device while building the quantum circuit.

16. The system of claim 14, further comprising program instructions executable by a classical processor to cause the processor to determine component retrieve stored qubit relaxation time values T1 for a qubit on the device.

17. The system of claim 16, further comprising program instructions executable by a classical processor to cause the processor to retrieve execution times for the respective basis gates on a qubit of the quantum circuit.

18. The system of claim 14, further comprising program instructions executable by a classical processor to cause the processor to render the visualization to an altered layout when execution time on a qubit reaches a threshold and stop the visualization at the end of the quantum circuit.

19. The system of claim 18, further comprising program instructions executable by a classical processor to cause the processor to represent and account for errors caused by qubit relaxation based on the altered visual appearance of the quantum circuit.

20. The system of claim 19, further comprising program instructions executable by a classical processor to generate a visualization of qubit stochastic errors accumulated throughout the quantum circuit using a gradient overlay and of the impact on the performance of the quantum circuit.

21. A system, comprising:
a memory that stores computer executable components; and
a quantum processor that executes the following computer executable components:
   a receiving component that receives a compiled quantum circuit from a classical computer;
   a computing component that multiplies a qubit value with a percentage of a qubit relaxation time set to generate a new threshold time for a qubit; and
   a transmitting component that transmits a computed quantum circuit to the classical computer.

22. The system of claim 21, further comprising the computing component determines a gate with longest execution time and divides the longest execution time by a threshold of an active qubit to generate a redness value for a qubit which employs the form:

$$1 - \exp\left[-\frac{t}{T_1}\right];$$

t is total circuit length; and
$T_1$ qubit relaxation time value.

23. The system of claim 21, wherein the system repeats generating error values represented by one or more colors to a gradient across a qubit of the quantum circuit.

24. A computer-implemented method comprising:
using the quantum processor to execute computer executable components stored in memory to perform the following acts:
using the quantum processor to receive a compiled quantum circuit from a classical computer;
using the quantum processor to compute a new threshold for a qubit by multiplying a qubit relaxation value with a percentage of a qubit relaxation time value; and
using the quantum processor to transmit a computed quantum circuit to the classical computer.

25. The method of claim 24, further comprising using the quantum processor to determine a gate with longest execution time and divide the longest execution time by a threshold of an active qubit to generate a redness value for a qubit which employs the form:

$$1 - \exp\left[-\frac{t}{T_1}\right];$$

t is total circuit length; and
$T_1$ qubit relaxation time value.

26. The method of claim 24, further comprising using the quantum processor to repeat generating error values represented by of one or more colors to a gradient across a qubit of the quantum circuit.

27. A computer program product comprising a computer readable storage medium having program instructions embodied therewith, the program instructions executable by a quantum processor to cause the quantum processor to:
receive, using the quantum processor, a compiled quantum circuit from a classical computer;
multiply, using the quantum processor, a qubit relaxation value with a percentage of a qubit relaxation time value; and
transmit, using the quantum processor, a computed quantum circuit to the classical computer.

28. The system of claim 27, further comprising program instructions executable by the quantum processor to cause the processor to determine a gate with longest execution time and divide longest execution time by a threshold of an active qubit to generate a redness value for a qubit which employs the form:

$$1 - \exp\left[-\frac{t}{T_1}\right];$$

t is total circuit length; and
$T_1$ qubit relaxation time value.

29. The system of claim 27, further comprising program instructions executable by the quantum processor to cause the processor to repeatedly generate error values represented by one or more colors to a gradient across a qubit of the quantum circuit.

* * * * *